(12) United States Patent
Hsu

(10) Patent No.: US 7,929,298 B2
(45) Date of Patent: Apr. 19, 2011

(54) NOTEBOOK COMPUTER AND SUPPORT STAND THEREOF

(75) Inventor: Sheng-Chieh Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 126 days.

(21) Appl. No.: 12/490,342

(22) Filed: Jun. 24, 2009

(65) Prior Publication Data

US 2010/0284146 A1 Nov. 11, 2010

(30) Foreign Application Priority Data

May 6, 2009 (CN) .......................... 2009 1 0302123

(51) Int. Cl.
*G06F 1/16* (2006.01)
*H05K 5/00* (2006.01)
*H05K 7/00* (2006.01)

(52) U.S. Cl. .................. 361/679.59; 361/679.12

(58) Field of Classification Search ............. 361/679.09, 361/679.12, 679.59
See application file for complete search history.

(56) References Cited

U.S. PATENT DOCUMENTS

| | | | | |
|---|---|---|---|---|
| 4,951,241 A * | 8/1990 | Hosoi et al. | ............. | 361/679.09 |
| 5,111,361 A * | 5/1992 | Kobayashi | ............... | 361/679.44 |
| 5,239,444 A * | 8/1993 | Sasaki | ...................... | 361/679.12 |
| 5,469,327 A * | 11/1995 | Cheng | ........................ | 361/679.55 |
| 5,544,011 A * | 8/1996 | Blaney et al. | ............ | 361/679.58 |
| 5,583,744 A * | 12/1996 | Oguchi et al. | ........... | 361/679.58 |
| 5,594,617 A * | 1/1997 | Foster et al. | ............. | 361/679.02 |
| 5,818,690 A * | 10/1998 | Spencer | ................... | 361/679.09 |
| 5,900,848 A * | 5/1999 | Haneda et al. | ................. | 345/1.1 |
| 5,901,035 A * | 5/1999 | Foster et al. | ............. | 361/679.55 |
| 5,918,957 A * | 7/1999 | Bovio et al. | ............. | 312/223.2 |
| 6,097,592 A * | 8/2000 | Seo et al. | ................. | 361/679.55 |
| 6,351,372 B1 * | 2/2002 | Kim | ......................... | 361/679.15 |
| 6,353,529 B1 * | 3/2002 | Cies | ......................... | 361/679.05 |
| 6,532,147 B1 * | 3/2003 | Christ, Jr. | ................. | 361/679.27 |
| 6,636,419 B2 * | 10/2003 | Duarte | ..................... | 361/679.09 |
| 6,771,493 B2 * | 8/2004 | Chen | ........................ | 361/679.11 |
| 6,862,171 B1 * | 3/2005 | Maskatia et al. | ......... | 361/679.06 |
| 6,980,423 B2 * | 12/2005 | Tanaka et al. | ............ | 361/679.06 |
| 7,068,497 B2 * | 6/2006 | Chu | ......................... | 361/679.06 |
| 7,106,579 B2 * | 9/2006 | Maskatia et al. | ......... | 361/679.28 |
| 7,206,198 B2 * | 4/2007 | Wang | ....................... | 361/679.55 |
| 7,298,610 B2 * | 11/2007 | Kim et al. | ................. | 361/679.55 |
| 7,542,276 B2 * | 6/2009 | Chang | ...................... | 361/679.59 |
| 7,715,190 B2 * | 5/2010 | Tang | ........................ | 361/679.55 |
| 7,746,636 B2 * | 6/2010 | Tang | ........................ | 361/679.55 |

(Continued)

*Primary Examiner* — Jayprakash N Gandhi
*Assistant Examiner* — Adrian S Wilson
(74) *Attorney, Agent, or Firm* — Raymond J. Chew

(57) ABSTRACT

A notebook computer include a base unit having a pivot end, a display unit piovtably attached to the pivot end of the base unit, and two support stands attached to the base unit near the pivot end. The base unit includes a top surface defining a recessed portion and two side surfaces. Each of the support stands includes a first supporting element slidable along the recessed portion includes a first and second boards. A first pivot post is formed on the first board to be slidably received in a first sliding slot defined in a first sidewall of the recessed portion, and pivotable when the first pivot post reaches an end of the recessed portion near the corresponding side surface, the first board pivotable to a position that is substantially perpendicular to a plane to seat the second board on a plane thereby tilting the base unit on the plane.

11 Claims, 6 Drawing Sheets

U.S. PATENT DOCUMENTS

| | | |
|---|---|---|
| 7,821,786 B2 * | 10/2010 | Hadad et al. ............. 361/679.59 |
| 7,855,883 B2 * | 12/2010 | Tang ........................ 361/679.55 |
| 2003/0006942 A1 * | 1/2003 | Searls et al. .................. 345/1.1 |
| 2003/0081376 A1 * | 5/2003 | Helot et al. .................. 361/683 |
| 2006/0050471 A1 * | 3/2006 | Chen ............................. 361/681 |
| 2007/0086154 A1 * | 4/2007 | Koch ............................ 361/681 |
| 2007/0217135 A1 * | 9/2007 | Chuang et al. ................ 361/681 |
| 2010/0002379 A1 * | 1/2010 | Hadad et al. ............. 361/679.59 |
| 2010/0020490 A1 * | 1/2010 | Lin ........................ 361/679.55 |
| 2010/0027218 A1 * | 2/2010 | Lin et al. .................. 361/679.59 |

* cited by examiner

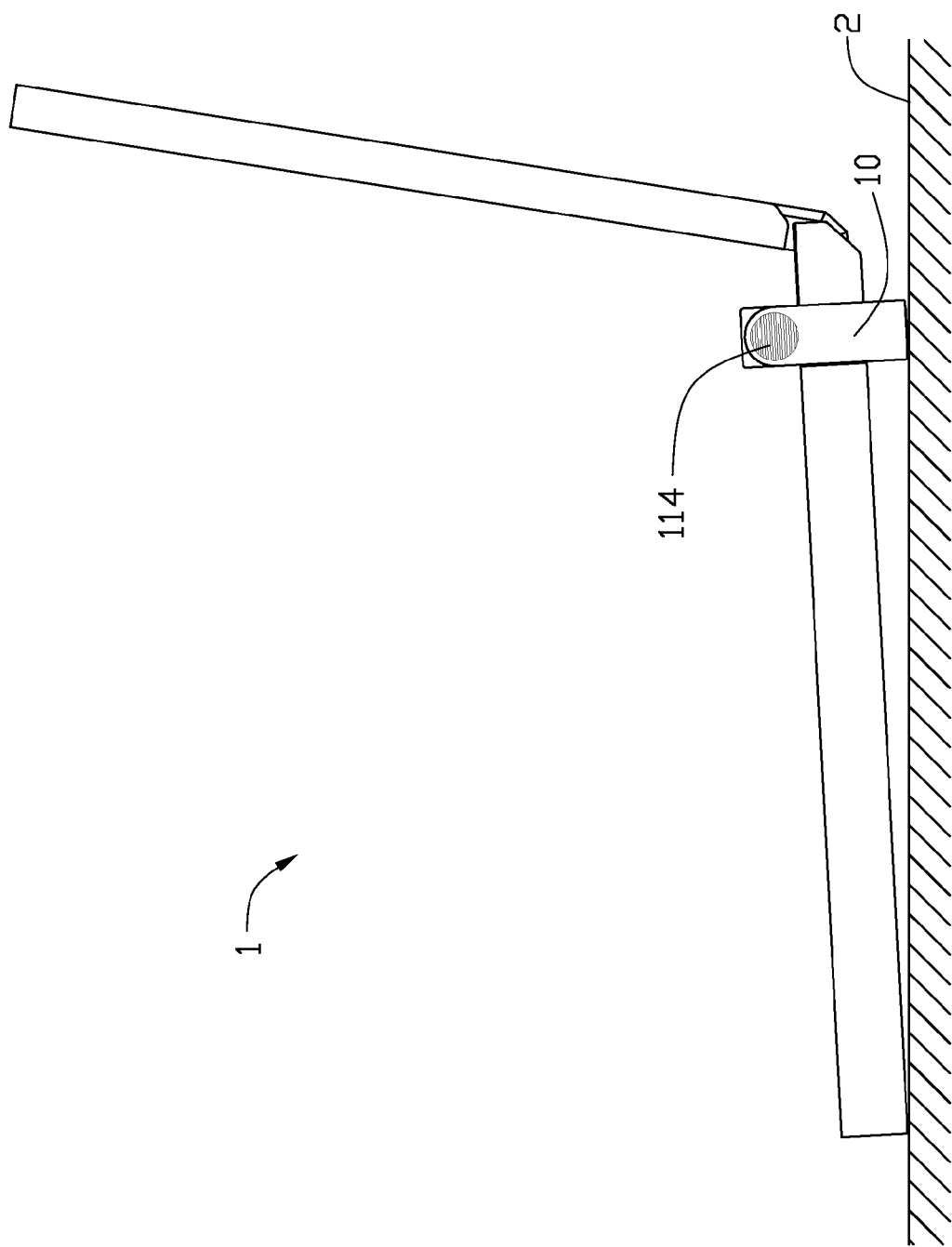

NOTEBOOK COMPUTER AND SUPPORT STAND THEREOF

BACKGROUND

1. Technical Field

The present disclosure relates to notebook computers, and particularly to a notebook computer having a support stand.

2. Description of Related Art

Notebook computers are increasingly used by people. Typically, the bottom of a contemporary notebook computer is placed level on a desk, which blocks airflow flowing through ventilation through holes defined in the bottom of the notebook computer, thus lowering heat dissipation efficiency. Additionally an operator may feel uncomfortable having to use a keyboard set completely level.

BRIEF DESCRIPTION OF THE DRAWINGS

FIG. 6 is a side view of FIG. 5.

DETAILED DESCRIPTION

Figure 1:
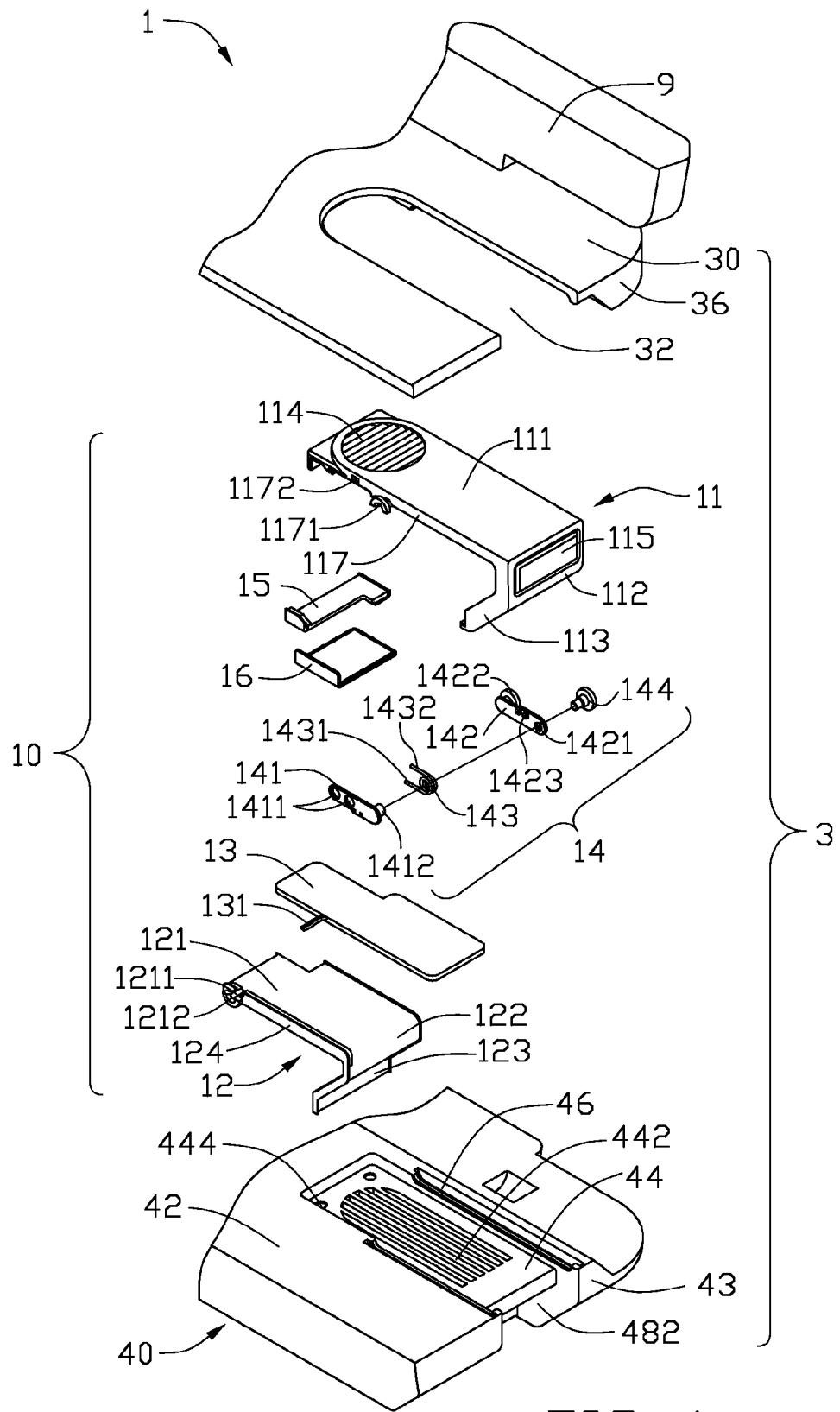
FIG. 1 is a partial, exploded, isometric view of an exemplary embodiment of a notebook computer, the notebook computer including two support stands.
Figure 2:
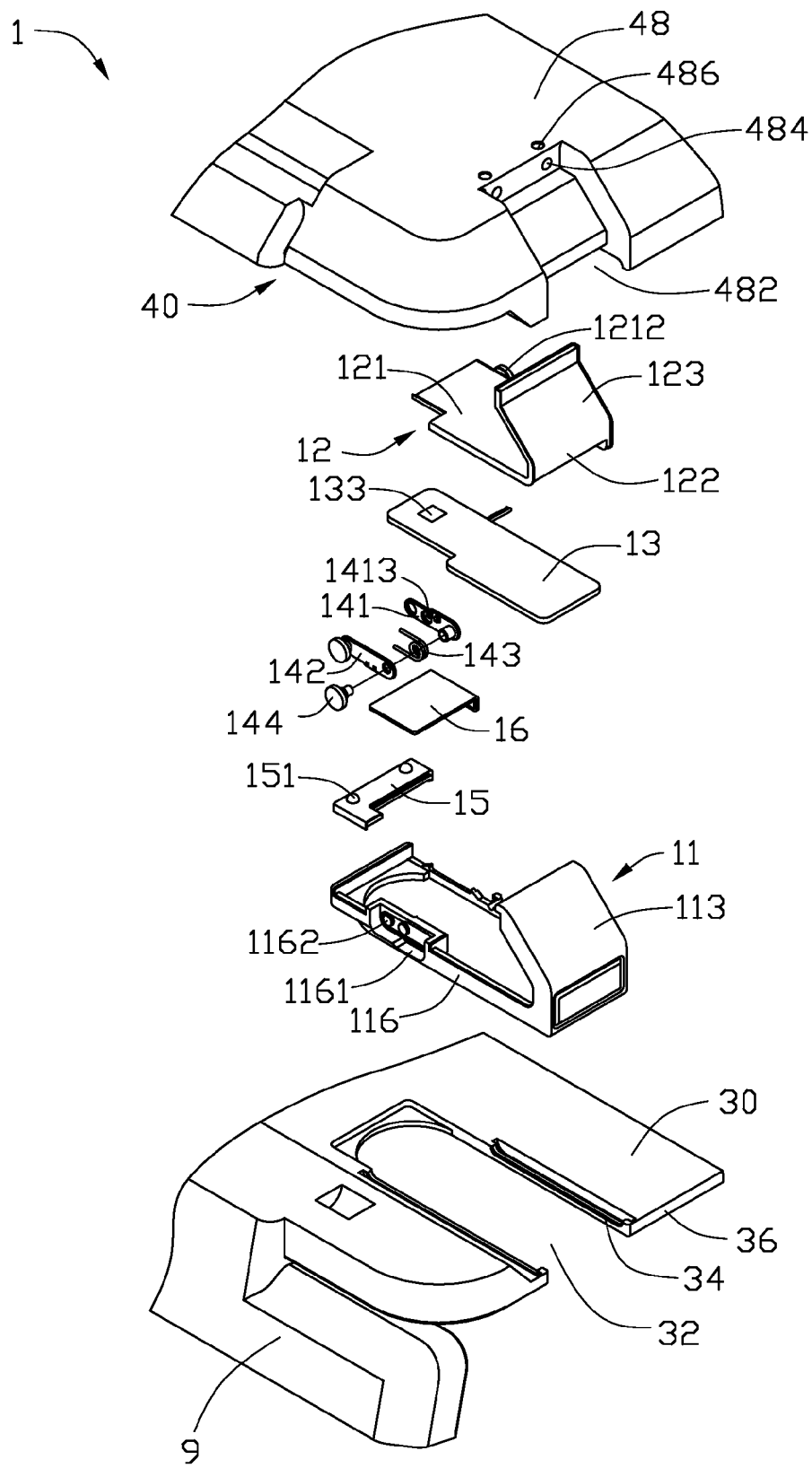
FIG. 2 is similar to FIG. 1, but viewed from an inverted aspect.
Figure 5:
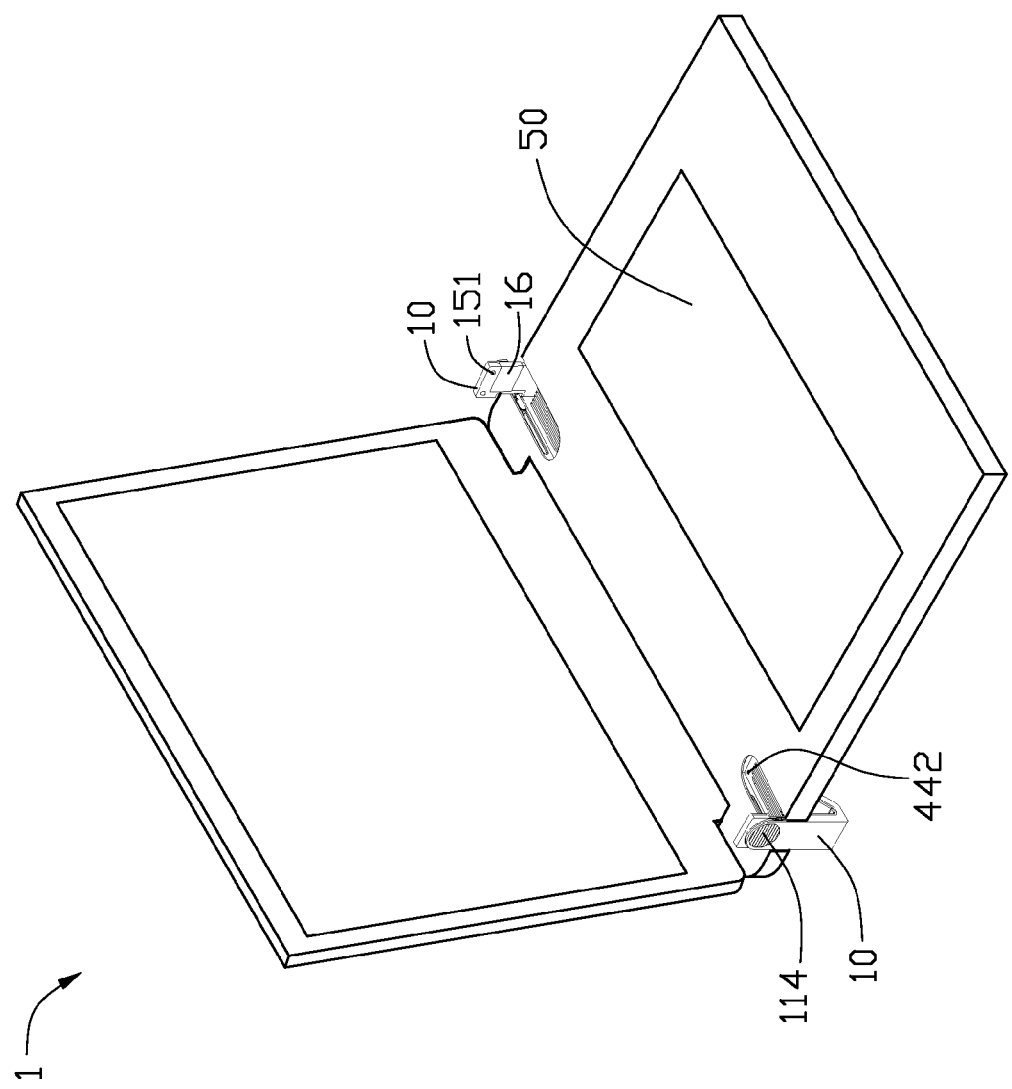
FIG. 5 is an isometric view of FIG. 4, but with the support stands in use.

Referring to FIGS. 1, 2 and 5, an exemplary notebook computer 1 includes a base unit 3, a display unit 9 pivotably connected to a pivot end of the base unit 3, and two support stands 10 attached to two sides of the base unit 3 adjacent to the pivot end of base unit 3. The base unit 3 includes an upper cover 30 and a lower cover 40 to engage with the upper cover 30.

The upper cover 30 defines two U-shaped openings 32 in two sides thereof. For simplicity, only one opening 32 is shown and described. A first sliding slot 34 is defined in each of two opposite sidewalls of the opening 32, communicating with the opening 32.

The lower cover 40 includes a top surface 42, two opposite side surfaces 43, and a bottom surface 48. Two sides of the top surface 42 define two recessed portions 44 corresponding to the openings 32 of the upper cover 30. For simplicity, only one recessed portion 44 is shown and described. The bottom of the recessed portion 44 defines a plurality of ventilation holes 442 to communicate inner and outer spaces of the lower cover 40. The bottom surface 48 defines through holes (not shown) to allow airflow through the ventilation holes 442 when the base unit 3 is tilted by the support stands 10. Two first positioning holes 444 are defined in the bottom of the recessed portion 44, away from the corresponding side surfaces 43 of the lower cover 40. Two second sliding slots 46 corresponding to the first sliding slots 34 are defined in two opposite sidewalls of the recessed portion 44, communicating with the recessed portion 44 of the lower cover 40. Two sliding paths are formed by the first and second sliding slots 34 and 46. A latching slot 482 is defined in the side surface 43 of the lower cover 40, communicating with the recessed portion 44 and the bottom surface 48 of the lower cover 40. Two second positioning holes 484 are defined in an end wall of the latching slot 482. Two third positioning holes 486 are defined in the bottom surface 48, near the latching slot 482.

Configuration and function of the two support stands 10 are the same, therefore, only one support stand 10, as an example, is described hereinafter. The support stand 10 includes a first supporting element 11, a second supporting element 12 to engage with the first supporting element 11, a circuit board 13, a connecting unit 14, a fixing element 15, and a transparent board 16.

The first supporting element 11 is L-shaped, and includes a first board 111 having a ridged operating portion 114 on a first end of the first board 111, a second board 112 perpendicularity extending down from a second end opposite to the first end of the first board 111, and a third board 113 extending downward and inward from the second board 112. The first board 111 includes a first sidewall 116 and a second sidewall 117 opposite to the first sidewall 116. A dented portion 1161 is defined in the first sidewall 116 to receive the connecting unit 14. Two projections 1162 are set on the first sidewall of the first board 111 in the dented portion 1161 to engage with the connecting unit 14. A semicircular pivot post 1171 extends from the second sidewall 117 near the first end of the first board 111. A switch 1172 is set on the second sidewall 117 to connect to a power line 131 of the circuit board 13. The outer surface of the switch 1172 and the second sidewall 117 are coplanar. The supporting portion 112 is rectangular. A cushion 115 is attached to an outside surface of the supporting portion 112 for anti-slipping.

The second supporting element 12 is to engage with the first supporting element 11. The second supporting element 12 includes a first board 121 corresponding to the first board 111 of the first supporting element 11 and having a semicircular pivot post 1212 in a first end thereof, a second board 122 perpendicularity extending down from a second end of the first board 121 and corresponding to the second board 112 of the first supporting element 11, and a third board 123 extending downward and inward from the second board 122 and then perpendicularity extending downward. A sidewall 124 extends downwards from a side edge of the first, second and third boards 121, 122, and 123 to engage with the second sidewall 117 of the first supporting element 11. The semicircular pivot post 1212 extends from the sidewall 124 of the second supporting element 12. The first and second semicircular pivot posts 1171 and 1212 together form a first pivot post 17 (see FIG. 3), and the first pivot post 17 defines a through hole therein to allow the power line 131 of the circuit board 13 to extend therethrough. A pair of first projections 1231 (see FIG. 3) is set on a bottom of the third board 123, to engage with the second and third positioning holes 484 and 486.

A light source such as a light emitting diode (LED) 133 is electronically coupled to the circuit board 13. The power line 131 of the circuit board 13 is connected to the power line of the base unit 3 via the switch 1172 to receive power.

The connecting unit 14 includes a first connecting element 141, a second connecting element 142, a spring 143 to engage with the first connecting element 141 and second connecting element 142, and a fastener 144. The spring 143 is a torsion spring, and includes a coil portion, a first end 1431 and a second end 1432.

The first connecting element 141 defines two through holes 1411 therein corresponding to the projections 1162 of the first supporting element 11. A knob 1412 defining a hole therein is set on a side of the first connecting element 141. A first engaging block 1413 is set on the side of the first connecting element 141 to engage with the first end 1431 of the spring 143. A through hole 1421 is defined in one end of a side of the second connecting element 142. A second pivot post 1422 perpendicularity extends from the other end of the side of the second connecting element 142, and includes a bulging head. A second engaging block 1423 is set on the other side of the second connecting element 142 to engage with the second end 1432 of the spring 143. The fastener 144 also includes a bulging head, and a post extending through the through hole 1421 of the second connecting element 142 and the coil portion of the spring 143 to be fastened to the knob 1412 of the first connecting element 141.

The fixing element 15 is to engage with the first supporting element 11. Two second projections 151 are set on a surface of the fixing element 15 to engage with the first positioning holes 444 of the lower cover 40.

The transparent board 16 is engaged with the first supporting element 11 and the fixing element 15 to allow light from the LED 133 to pass through the transparent board 16 and light a keyboard area 50 of the notebook computer 1.

In other embodiments, the fixing element 15 and the transparent board 16 can be omitted, while, extending the first board 121 of the second supporting element 12 to engage with the first board 111 of the first supporting element 11. The first board 121 can be made of transparent material to allow the light from the LED 133 to pass through. Two blocks are set on the front end of the first board 121 to engage with the first positioning hole 444. The first pivot post 17 can be mounted on the first supporting element 11 or the second supporting element 12. When the notebook computer does not need light, the second supporting element 11 and the circuit board 13 can be omitted, while the second projections 151 are set on the front end of the operating portion 111, and the first projections 1231 is set on the bottom of the fixing portion 113. The sliding slot 46 can be defined in just one of the upper cover 30 and the lower cover 40.

Figure 3:
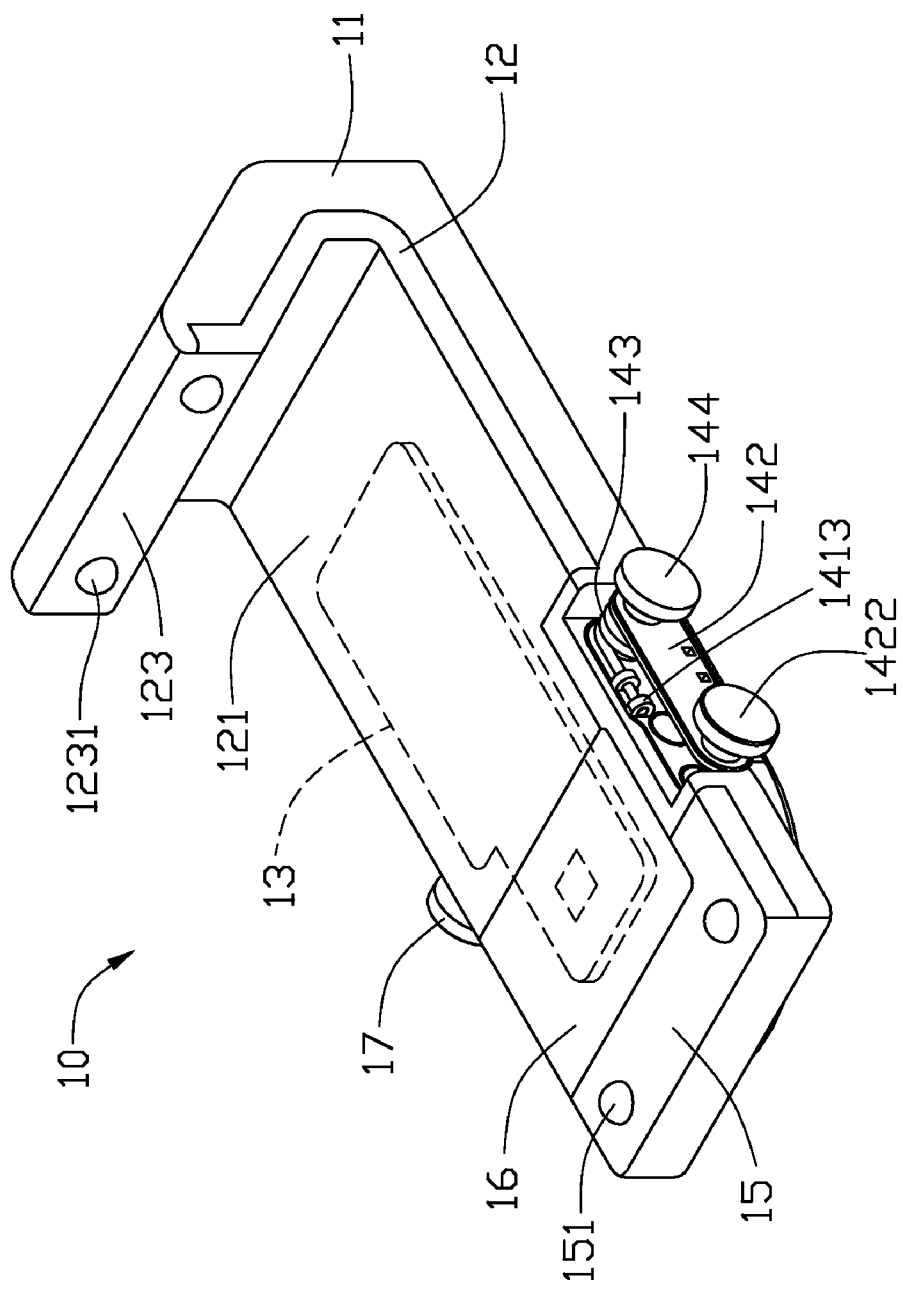
FIG. 3 is an assembled, isometric view of one of the two support stands of FIG. 1.

Referring to FIG. 3, in assembling the support stand 10, the first end 1431 of the spring 143 is engaged with the first engaging block 1413 of the first connecting element 141, and the second end 1432 of the spring 143 is engaged with the second engaging block 1423 of the second connecting element 142. The post of the fastener 144 passes through the through hole 1421 of the second connecting element 142 and the coil portion to be fastened to the knob 1412 of the first connecting element 141, to pivotally connect the first connecting element 141 to the second connecting element 142. The projections 1162 of the first supporting element 11 are engaged with the through holes 1411 of the second connecting element 142 of the assembled connecting unit 14, to pivotally engage the connecting unit 14 in the first supporting element 11. The circuit board 13 is set in the first supporting element 11. The second supporting element 12 is engaged with the first supporting element 11 to receive the circuit board 13 in a receiving cavity formed by the first and second supporting elements 11 and 12. The transparent board 16 is latched in the hole that is between the fixing element 15 and the second supporting element 12 to allow the light from the LED 133 to pass through the transparent board 16.

Figure 4:
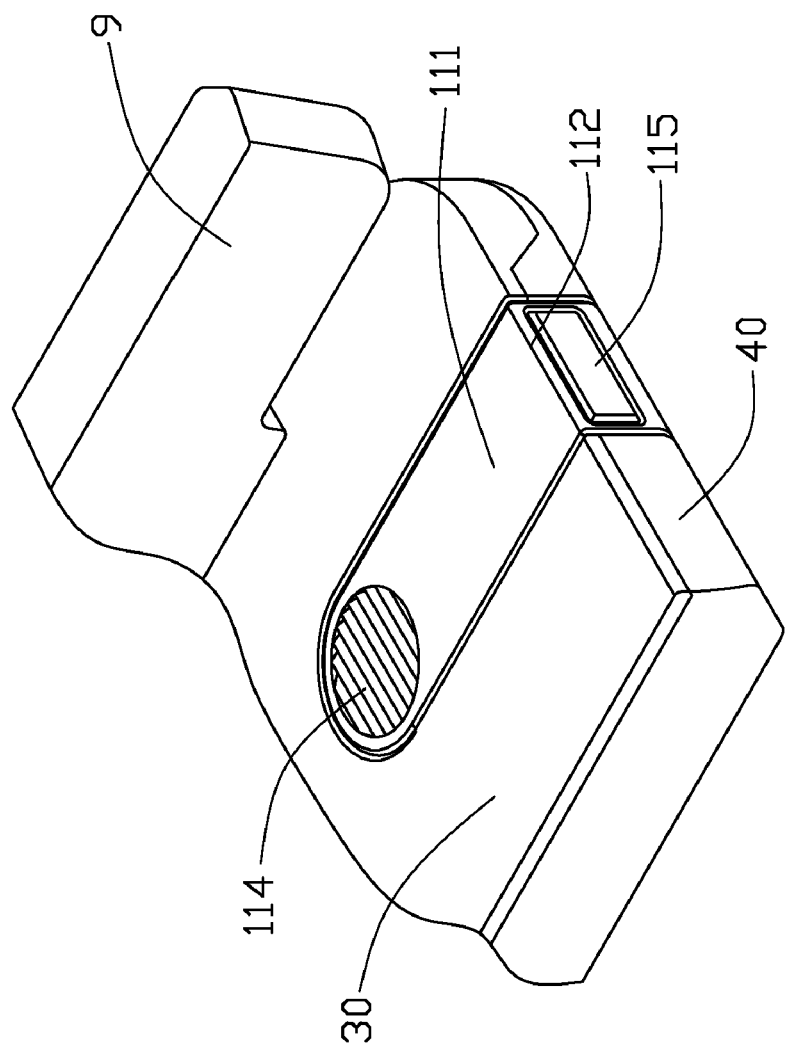
FIG. 4 is an assembled, isometric view of FIG. 1.

Referring to FIG. 4, assembling the assembled support stand 10 in the notebook computer 1. The head of the second pivot post 1422 of the connecting unit 14 and the head of the fastener 144 are engaged in the second sliding slot 46 near the display 20. The first pivot post 17 of the support stand 10 is engaged in the second sliding slot 46 away from the display 20. The support stand 10 is received in the recessed portion 44 defined in the top of the lower cover 40 and the latching slot 482 defined in the side surface 43. The second projections 151 of the fixing element 15 are engaged in the first positioning holes 444. The first projections 1231 of the third board 123 are engaged in the second positioning holes 484. The upper cover 30 is engaged with the lower cover 40, to allow the fastener 144, the first latching pole 17, and the second latching pole 1422 to slide in the sliding path formed by the first and second sliding slots 34 and 46. The opening 32 of the upper cover 30 corresponds to the operating portion 111. An outside surface of the operating portion 111 and the upper surface of the upper cover 30 are coplanar. An outside surface of the supporting portion 112 and the outer surface of the sidewall 36 of the upper cover 30 are coplanar.

Referring to FIGS. 5 and 6, in use, exerting force to the operating portion 114 of the first board 111 to disengage the second projections 151 of the fixing element 15 from the first positioning holes 444 of the lower cover 40. The first projections 1231 of the third board 123 are disengaged from the second positioning hole 484 of the lower cover 40. The first pivot post 17, the second pivot post 1422, and the fastener 144 of the support stand 10 slide forth to the end of the sliding path. Then the support stand 10 and the first connecting element 141 are rotated to be perpendicular to the second connecting element 142. The second board 112 of the first supporting element 11 seats on a plane, thereby making the base unit 3 angled to the plane. The first projections 1231 of the third board 123 is engaged in the third positioning holes 486 defined in the bottom surface 48 of the lower cover 40. The switch 1172 set on the sidewall 117 of the operating portion 111 can be operated to turn on and off the LED 133 to light the keyboard area 50 as desired.

To retract the support stand 10, force should be exerted to the support stand 10 to make the support stand 10 and the first connecting element 141 rotate back to an original position. The upper surface of the operating portion 111 and the surface of the upper cover 30 are coplanar.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A notebook computer comprising:
    a base unit comprising having a pivot end, the base unit comprising a top surface defining a recessed portion and two side surfaces;
    a display unit piovtably attached to the pivot end of the base unit; and
    two support stands attached to the base unit near the pivot end, each of the support stands comprising:
        a first supporting element slidable along the recessed portion defined in the top surface of the base unit, and comprising a first board, a first pivot post formed on the first board to be slidably received in a first sliding slot defined in a first sidewall of the recessed portion, and pivotable when the first pivot post reaches an end of the recessed portion near the corresponding side surface of the base unit, and a second board substantially perpendicular to the first board, the first board pivotable to a position substantially perpendicular to a plane to seat the second board on a plane thereby tilting the base unit on the plane.

2. The notebook computer of claim 1, further comprising a connecting unit to engage each of the support stands with the base unit, wherein the connecting unit comprises a first connecting element, a second connecting element, and a spring, the first board comprises a first sidewall and second sidewall, the first pivot post formed on the second sidewall, a dented portion is defined in the first sidewall to receive the connecting unit, when the second board seats on a plane, the first connecting element is substantially perpendicular to the second connecting element.

3. The notebook computer of claim 2, wherein the spring is a torsion spring, and comprises a coil portion, a first end engaged with the first connecting element and a second end engaged with the second connecting element, a through hole is defined in one end of a side of the second connecting element, a second pivot post perpendicularity extends from the other end of the side of the second connecting element, the connecting unit comprises a fastener comprising a bulge head and a post extending through the through hole of the second connecting element and the coil portion of the spring to be fastened to the first connecting element, the second pivot post and the head of the fastener are slidably received in a second sliding slot defined in a second sidewall opposite to the first sidewall of the recessed portion.

4. The notebook computer of claim 1, wherein each of the support stands further comprises a second supporting element to latch with the first supporting element, the second supporting element comprises a first board corresponding to the first board of the first supporting element.

5. The notebook computer of claim 4, wherein each of the support stand further comprises a circuit board having a light source, the circuit board is received in a space formed by the first supporting element and the second supporting element, a power line of the circuit board passes through the support stand to connect to a power line in the base to receive power.

6. The notebook computer of claim 1, wherein at least one first positioning hole is defined in the bottom of the recessed portion, away from the corresponding side surface of the base unit, at least one projection is mounted on one end of the first board, away from the second board, to engage with the at least one first positioning hole of the base unit.

7. The notebook computer of claim 1, wherein a bottom of the recessed portion defines a plurality of ventilation holes to communicate inner and outer spaces of the base unit, a bottom of the base unit defines a plurality of through holes corresponding to the plurality of ventilation holes.

8. A support stand to tilt a base unit of a notebook computer on a plane, the support stand comprising:

a first board comprising a first sidewall and a second sidewall, a first pivot post formed on the first sidewall of the first board; and a second board substantially perpendicularly extending from one end of the first board; and a connecting unit comprising:

a first connecting element connected to the second sidewall of the first board;

a second connecting element having one end pivotably attached to the first connecting element, and another end forming a second pivot post thereon; and a spring connected between the first connecting element and second connecting element; wherein the first and second pivot posts pivotably received in two sliding slots of the base unit of the notebook computer, the first board pivotable to a position substantially perpendicular to the plane to seat the second board on the plane thereby tilting the base unit on the plane and rotate the second connecting element to be perpendicular to the first connecting element.

9. The support stand of claim 8, wherein the spring is a torsion spring, and comprises a coil portion, a first end engaged with the first connecting element and a second end engaged with the second connecting element, a through hole is defined in one end of a side of the second connecting element, the second pivot post perpendicularity extends from the other end of the side of the second connecting element, a recessed portion is formed on the second sidewall of the first board to receive the first connecting element, the connecting unit comprises a fastener comprising a bulge head and a post extending through the through hole of the second connecting element and the coil portion of the spring to be fastened to the first connecting element.

10. The support stand of claim 8 further comprising a second supporting element to latch with the first supporting element, wherein the second supporting element comprises a first board corresponding to the first board of the first supporting element.

11. The support stand of claim 10 further comprising a circuit board having a light source, wherein the circuit board is received in a space formed by the first supporting element and the second supporting element, a power line of the circuit board passes through the support stand to receive power from the notebook computer.

\* \* \* \* \*